United States Patent
Kleifges et al.

[11] Patent Number: 5,988,343
[45] Date of Patent: Nov. 23, 1999

[54] CLUTCH DISC WITH A TORSIONAL VIBRATION DAMPER FOR A MOTOR VEHICLE FRICTION CLUTCH

[75] Inventors: Jürgen Kleifges, Schweinfurt; Erwin Wack, Niederwerrn, both of Germany

[73] Assignee: Fichtel & Sachs AG, Schweinfurt, Germany

[21] Appl. No.: 08/833,073

[22] Filed: Apr. 3, 1997

[30] Foreign Application Priority Data

Apr. 4, 1996 [DE] Germany ............ 196 13 574

[51] Int. Cl.$^6$ ............... F16D 3/66; F16D 13/64
[52] U.S. Cl. ................. 192/213.12; 192/213.22
[58] Field of Search ............ 192/70.17, 213.22, 192/213.21, 213.2, 213.12; 464/68

[56] References Cited

U.S. PATENT DOCUMENTS

| | | | |
|---|---|---|---|
| 3,101,600 | 8/1963 | Stromberg | 192/213.2 X |
| 3,138,011 | 6/1964 | Stromberg | 464/68 |
| 3,327,820 | 6/1967 | Maurice | 464/68 X |
| 4,562,912 | 1/1986 | Kabayama | 192/213.21 |
| 4,591,348 | 5/1986 | Takeuchi et al. | |
| 4,601,677 | 7/1986 | Takeuchi | 464/68 |
| 4,603,767 | 8/1986 | Blond | |
| 4,618,048 | 10/1986 | Kobayashi | 192/213.22 |
| 4,700,821 | 10/1987 | Maucher et al. | 464/68 X |
| 4,860,871 | 8/1989 | Graton et al. | 464/68 X |
| 5,542,516 | 8/1996 | Wack | 192/213.22 X |

FOREIGN PATENT DOCUMENTS

| | | |
|---|---|---|
| 3407524 | 9/1985 | Germany . |
| 3614158 | 10/1987 | Germany . |
| 4419424 | 1/1995 | Germany . |
| 2034004 | 5/1980 | United Kingdom . |
| 2093564 | 9/1982 | United Kingdom . |
| 2234322 | 1/1991 | United Kingdom . |

*Primary Examiner*—Rodney H. Bonck
*Attorney, Agent, or Firm*—Nils H. Ljungman & Associates

[57] ABSTRACT

A torsional vibration damper, for installation in the clutch disc of a motor vehicle friction clutch, the damping spring system of which torsional vibration damper comprises at least three spring stages which are sized for different torque ranges of the torque to be transmitted between an input component and an output component. The spring stages are graduated so that they are active in corresponding ranges of the relative angle of rotation between the input component and the output component. The torsional vibration damper comprises a pre-damper which is sized for operation at idle, a low-speed damper which is sized for travel at slow speeds, and a load damper which is sized for load operation. The spring stage of the low-speed damper has an initial torque which is lower than the final torque of the pre-damper, and the load damper also has an initial torque which is lower than the final torque of the low-speed damper. The pre-damper and the low-speed damper are connected to the output part by means of toothings in their disc parts which guide the damper springs so that they are axially movable, but have a rotational play which corresponds to the working range of the dampers. Friction devices corresponding to the individual damper stages can be installed between the individual disc parts.

10 Claims, 6 Drawing Sheets

CLUTCH DISC WITH A TORSIONAL VIBRATION DAMPER FOR A MOTOR VEHICLE FRICTION CLUTCH

BACKGROUND OF THE INVENTION

1. Field of the Invention

This invention relates to a torsional vibration damper which is designed for installation in the drive train of a motor vehicle, in particular for installation in a clutch disc of a motor vehicle friction clutch.

2. Background Information

When a motor vehicle is travelling either at extremely slow speeds or at slow speed on a level road or on a slight uphill or downhill grade, the engine of the motor vehicle is subjected to a torque between approximately 20 Nm when accelerating and approximately 10 Nm when decelerating. Under these operating conditions, transmission or rattling noises can occur, in particular when the transmission is in first or second gear.

To suppress transmission noises of this type during operation at idle, an idle or pre-damper is used in addition to the load damper which is sized for the operation under load of a torsional vibration damper, which pre-damper is integrated into the clutch disc of a motor vehicle friction clutch, the spring stage of which was sized for torques which were significantly lower than the torque to be transmitted in operation under load. In known torsional vibration dampers of clutch discs, the angle of rotation was limited, or similar measures were used, to ensure that the working range of the pre-damper was limited to an angular range around the idle position of the torsional vibration damper. In the adjacent working angle range of the load damper, the pre-damper was bridged or bypassed.

In conventional torsional vibration dampers, the torque range which is experienced during travel at extremely slow speeds lies near the lower limit of the working range of the load damper. In this range, the torsional rigidity of the torsional vibration damper is already so great that the above-mentioned noises in the transmission can be excited.

Previous attempts to damp such transmission noises have included approaches which involve modifying the drive train by means of the installation of a flywheel which has two inertial masses, or alternatively, by active interventions in the engine control system, but such solutions are relatively complex and expensive.

It is known that multi-stage damper spring systems can be integrated into clutch discs of motor vehicle friction clutches. If it is only necessary to realize one pre-damper and one load damper, the space available, which is generally at a premium, is sufficient for the installation of the spring stages. The installation of more than two spring stages which must be sized for different working ranges is frequently impossible because of a lack of available space. Moreover, the tuning of an idle or pre-damper on one hand and a damper for operation at extremely slow speeds sized in the manner explained above for travel at extremely slow speeds is also problematic on account of the proximity both of the working angle ranges and the torque ranges, in particular if there is only a small amount of space available, in particular in the axial direction. Multi-stage dampers are also generally complex, time consuming and expensive to install. Known devices of this type also include torsional vibration dampers, the damping spring systems of which have a flattened spring characteristic.

DE-A-36 14 158, for example, discloses a torsional vibration damper which, in common apertures of a central disc on one hand and two lateral discs which are located axially one on either side of the central disc, contains pairs of damper springs which are supported on one another by means of a freely-moving intermediate piece. The intermediate piece, which can consist of intermediate discs on both sides of the central disc which are oriented so that they can rotate, has stops to limit the angle of rotation of the individual springs of each spring pair, to achieve a graduation of the spring characteristic.

DE-A-34 07 524 discloses that the working range of the pre-damper of a torsional vibration damper integrated into a clutch disc can be limited, and by applying a bias to the springs of a spring stage which is sized for load operation, it is possible to ensure that the initial torque of the load spring stage will be less than the final torque of the pre-damper spring stage. In this manner, the two spring stages which are connected in series can be made to work together in the transitional range, and a transition between the damper characteristic of the pre-damper spring stage on the one hand and the damper characteristic of the load damper stage on the other hand results which avoids sudden changes in torque.

To simplify the installation of multi-stage torsional vibration dampers, in particular for clutch discs, U.S. Pat. No. 4,603,767 teaches that the pre-damper can be realized in the form of an independently functioning module which can be handled separately, so that the pre-damper can be assembled and tested independently of the process of assembling and installing the load damper, before the pre-damper and the load damper are combined.

OBJECT OF THE INVENTION

The object of the invention, which is intended for installation in the drive train of a motor vehicle, in particular for installation in a clutch disc of a motor vehicle friction clutch, is to create a torsional vibration damper which takes up only a small amount of space, in particular in the axial direction, and makes possible the realization of at least three spring stages, without excessive technical complexity. In particular, it must be possible to graduate the damper characteristics at relatively low torques, e.g. like those which occur during idling and during travel at slow or extremely slow speeds.

SUMMARY OF THE INVENTION

The present invention is based on a torsional vibration damper which comprises:

an input component which can rotate around an axis of rotation, an output component which can rotate both together with and relative to the input component around the axis of rotation, and a damper spring system which couples the input component and the output component to one another with rotational elasticity, and which damper spring system has a plurality of spring stages which are sized for different torque ranges of the torque to be transmitted between the input component and the output component, which spring stages are active in a graduated manner in corresponding ranges of the relative angle of rotation between the input component and the output component.

The present invention shows a damper spring system which system can comprise at least three spring stages, of which at least the first spring stage, which can be sized for the range of the lowest torque, and the second spring stage, which is sized for the next-higher torque range, can be connected in series. The second spring stage can have an initial torque which is lower than the final torque of the first spring stage, and the third spring stage can be sized for torques which are greater than the torques of the first and the second spring stages, and can be located on the side of the first and the second spring stages facing radially away from the axis of rotation. The connection in series of the first spring stage, which can be sized for example for idle operation, and the second spring stage which can be sized, for example, for travel at extremely slow speeds, at an initial torque of the second spring stage selected lower than the final torque of the first spring stage, ensures that transmission noises can be suppressed over a relatively large range of relative angles of rotation with continuous transitions, but not at the expense of the damping of torsional vibrations in the load range. Because the springs of the first and second spring stage are connected in series, they can easily be installed inside the space which is occupied in any case by the springs of the spring stage which is sized for load operation. Particularly simple and compact solutions are possible if the third spring stage is also connected in series with the first and second spring stages. In this case, too, the third spring stage appropriately has an initial torque which can be lower than the final torque of the second spring stage, to prevent sudden changes in torque in the event of the transition of the damping operation from the second spring stage into the third spring stage. The sizing of the initial torque of the second and third spring stages can be achieved by applying a bias to at least one spring of each of these spring stages.

The object of the present invention as stated above, of creating a torsional vibration damper which has at least three spring stages and is compact, in particular in the axial direction, can be accomplished by a second aspect of the teaching of the invention, which can be realized both together with the first aspect explained above and also independently of it. In this second aspect, a first of the at least three spring stages comprises at least one first spring which can couple a central disc part which is non-rotationally connected to one of the modules, i.e. the input component and output component, rotationally elastically with at least one first lateral disc, which first lateral disc is located axially to the side of the central disc part and can rotate to a limited extent inside a first relative angle of rotation relative to the central disc part. A second spring stage comprises at least one second spring which can couple each first lateral disc rotationally elastically with at least one second lateral disc which second lateral disc, is located axially to the side of the first lateral disc and can rotate to a limited extent within a second relative angle of rotation which is larger than the first relative angle of rotation relative to the central disc part. Each second lateral disc is connected to the other of the modules, i.e. the input component and output components, in a torque-transmitting connection, and the first spring stage can be sized for the range of the lowest torque to be transmitted between the input component and the output component, and the second spring stage is sized for the next-higher torque range.

The individual components of such a torsional vibration damper are, for the most part, used for more than one purpose, which contributes to a reduction of the amount of space required for installation. The series connection of at least the first and the second spring stage makes it possible to locate their springs in a space-saving manner radially one above the other or one behind the other in the peripheral direction. The first and the second relative angles of rotation thereby relate to the area between an idle position of the output component with reference to the input component, and maximum values of the relative angles of rotation as they may be defined by stops or similar measures. The range of the relative angle of rotation of the individual spring stages, with reference to the other spring stages, however, can thereby be smaller and can be limited by these or additional stops both at the lower limit and also at the upper limit of the spring stage in question.

It is possible to arrive at a particularly narrow embodiment if the third spring stage of the damper spring system comprises at least one third spring which couples each second lateral disc rotationally elastically with two third lateral discs, which two third lateral discs are located axially, one on each side of the first and second lateral discs, non-rotationally with one another and the other of the modules - input component and output component. In such a configuration, all three spring stages are connected in series, whereby the first and the second spring stages are located so that they are protected inside the contour of the torsional vibration damper which is defined by the third lateral discs.

In spite of the plurality of spring stages, the torsional vibration damper can be very easily installed if the central disc part, each first lateral disc, and each first spring of the first spring stage, together form a module which can be handled separately from the other spring stages. In this manner, the first spring stage can be pre-assembled and tested to verify its correct operation, if necessary, before it is combined with the other spring stages. As a result of this measure, not only can the assembly and installation processes be simplified, but the proportion of defective final products can also be reduced.

The central disc part can appropriately be located axially between two first lateral discs which can be non-detachably connected to one another, and the central disc part, as well as both first lateral discs, can have apertures or recesses in which both each first spring and also each second spring can be located, and namely so that each first spring can be fixed in position axially between the first two lateral discs and each second spring can be inserted into the module after the first lateral discs have been connected to form a single module. The second springs are installed only after the testing of the first spring stage has been completed, so that the correct operation of the first spring stage can be verified in a very early phase of the assembly process.

The central disc part can preferably be located together with the first lateral disc axially between two second lateral discs which are non-rotationally connected to one another, and the central disc part, each first lateral disc and both second lateral discs preferably also have apertures or recesses for each second spring, which in this manner is fixed in position axially between the two lateral discs. Including the first spring stage, which can also be realized in the form of a module if necessary, it can thereby also be possible in this manner to preassemble the second spring stage in the form of a module which can be handled and tested separately from the third spring stage to verify its correct operation. The fabrication of the individual spring stages and the overall assembly of the torsional vibration damper can thereby be distributed over a plurality of assembly stations, which can facilitate the assembly process.

The limitation of the relative angle of rotation of the first lateral discs relative to the central disc part and of the second lateral discs relative to the first lateral discs and/or to the central disc part can be done in a known manner by means of spacer rivets or tabs or the like, which axially overlap the respective lateral discs, which tabs are inserted in recesses of the respective other module which has a limited angle of rotation. In a preferred embodiment, i.e. one which is preferred because it is simple to manufacture, mechanically stable and easy to assemble, the invention teaches that the one of the modules, i.e. the input component and the output component, which module is non-rotationally connected to the central disc part, can have toothing in which at least the one first lateral disc is engaged with a rotational play which corresponds to the first relative angle of rotation and at least the one second lateral disc can be engaged with a rotational play which corresponds to the second relative angle of rotation, but otherwise is engaged non-rotationally with matching toothing. The central disc part and the first and second lateral discs can preferably be ring-shaped discs which are shaped from sheet metal and which have the matching toothing on their inside periphery, so that during the assembly process they can be axially inserted over, for example, the outer toothing of a hub which forms the output component. This arrangement can be used in particular when the first and/or the second spring stage is realized in the form of a module which can be inserted as such on the hub. Because the toothing of the hub of the first and the second spring stages is something they have in common, the relative angle of rotation of these spring stages can be realized with relatively low tolerances.

At least one second lateral disc of the second spring stage can be used for the actuation of springs of the third spring stage. The other of the two modules, i.e. the input component and output component, can comprise two third lateral discs, axially between which two third lateral discs each second lateral disc is located, whereby at least one second lateral disc and both third lateral discs have apertures or recesses used to locate each third spring. Appropriately, in this context, there can be two second lateral discs which run in flat contact with one another on the side of each first lateral disc which is radially farther from the axis of rotation, and in this area can jointly form the separate aperture which corresponds to each third spring. In this manner, the contact surfaces by means of which these apertures are in contact with the end surfaces of each third spring can be made relatively wide, without having to make the material thickness of the disc parts unnecessarily large in the area of the second springs.

In one preferred embodiment, the average distance of each first spring from the axis of rotation can be greater than the average distance of each second spring from the axis of rotation. Although in this configuration the normally harder second springs are located closer to the axis of rotation than the normally softer first springs, the axial distance between the second lateral discs can be reduced in this manner, because the first springs, which are normally smaller in diameter, can be installed completely between closed walls of the second disc parts. The second springs, on account of their normally larger diameter, can project beyond the first lateral discs and can be engaged in the apertures of the second lateral discs. In the vicinity of each first spring, each first and/or each second lateral disc can essentially be planar, which can, in particular, reduce the amount of axial space required.

In one preferred embodiment, there can be two ring-shaped first lateral discs which can be non-rotationally connected to one another and which, in the vicinity of their inside peripheries, can be at a smaller axial distance from one another than in the vicinity of their outside peripheries. In this manner, in the vicinity of the inside periphery, an axial space can be created between neighboring first and second lateral discs for the installation of friction devices. The two first lateral discs appropriately run conically, or have a conical shape, in the vicinity of the apertures or recesses which hold the second springs, and namely so that the edges of the aperture which interact with the end surfaces of the second springs can also be used to locate or capture the end surfaces to reduce wear over greater chord lengths.

One advantage of the torsional vibration damper in accordance with the present invention is that in spite of its plurality of spring stages, it can make available space for friction devices for the controlled friction damping of the spring stages. In an embodiment which is suitable in particular for use in clutch discs of motor vehicle friction clutches, the invention teaches that one of the modules i.e. the input and output components, comprises a hub which is provided on its outside periphery with toothing, that the central disc part, two first lateral discs which are non-rotationally connected to one another and are axially supported on one another, and two second discs which are non-rotationally connected to one another and are axially supported on one another, are engaged by means of matching toothing on at least one of the first and the second lateral discs so that they can move axially in the toothing of the hub, that the central disc part, the first and the second lateral discs are located axially between two third lateral discs which are non-detachably connected to one another, at least one of which third lateral discs is guided so that it can rotate on the hub but is axially fixed in position, and that components of at least one friction device are located axially each between at least one of the second lateral discs and a neighboring first lateral disc and axially between at least one of the second lateral discs and a neighboring third lateral disc. These two friction devices make possible the controlled frictional damping of the second and the third spring stages, and can be installed in the space which is already available for the torsional vibration damper.

The friction moments generated by the two friction devices can be sized independently of one another, if the second lateral discs are non-detachably connected to one another and the friction device which is located between the first and second lateral discs and the friction device which is located between the second and third lateral discs each comprise a separate, axially acting spring. In this embodiment, the force paths of the axially acting springs are conducted via separate lateral disc connecting means.

In principle, however, a single axially acting spring is sufficient to generate the axial force of the two friction devices. The magnitude of the friction moments generated by the two friction devices is then a function of the average frictional diameter and the coefficients of friction of the materials which are in frictional contact. An embodiment of this type is characterized by the fact that, between one of the two second lateral discs on one hand, and both the neighboring first lateral disc and the neighboring third lateral disc on the other hand, there are respective friction rings, and between the other of the two second lateral discs on one hand, and the neighboring first lateral disc and the neighboring third lateral disc on the other hand, there is an additional friction ring, as well as an axially acting spring which is common to the friction devices, whereby the additional friction ring and the axially acting spring are located on axially farther or opposite sides of the other second lateral disc. In this case, the force transmission path of the common, axially acting spring runs via the connecting means of the third lateral discs on one hand and the friction rings as well as the connecting means of the first lateral discs on the other hand. For a more efficient utilization of the installation space available, the common, axially acting spring is preferably located axially between the second lateral disc and the neighboring third lateral disc.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

Embodiments of the invention are explained in greater detail below with reference to the accompanying drawings.

DESCRIPTION OF THE PREFERRED EMBODIMENT

FIGS. 1 to 4 illustrate a clutch disc of a motor vehicle friction clutch with a hub 1 which can be attached centrally and non-rotationally, but so that it can move axially, by means of inside toothing 3 to an input shaft (not shown in any further detail) of a transmission which is downstream in the drive train, which input shaft can rotate around an axis of rotation 5. Friction linings 7 of the clutch disc, which friction linings 7 concentrically surround the axis of rotation 5 in a ring shape, are in a torque-transmitting connection with the hub 1 by means of lining springs 9 and a torsional vibration damper which is designated 11 in general. The torsional vibration damper 11 couples the friction linings 7 to the hub 1 with rotational elasticity, whereby the torsional vibration damper 11 guides the friction linings 7 radially and axially so that they can rotate over a limited angle of rotation around the axis of rotation 5 relative to the hub 1.

The torsional vibration damper 11 has a damping spring system which has three spring stages 13, 15 and 17, which spring stages 13, 15 and 17 are sized for different ranges of magnitude of the torques, and are active in ranges of different angles of rotation between the hub 1 and the friction linings 7.

The spring stage 13 is realized in the form of a pre-damper stage and is essentially sized for use in idle operation to suppress transmission noises and transmission rattles. The spring stage 13 has a plurality of springs 19, in this case two, which are located at approximately the same distance from the axis of rotation 5. The springs 19 are relatively soft and accordingly have a "flat" torque/relative-angle-of-rotation characteristic.

The spring stage 15 is active in a torque range of the type which can occur during slow travel or extremely slow travel of the motor vehicle on a level road or on slight uphill or downhill grades, if the transmission is in a low gear, for example first or second gear. Under these conditions, the engine of the motor vehicle is loaded with a relatively low drive moment between, for example, 10 Nm in acceleration and 10 Nm in deceleration. Under these operating conditions, the damper for extremely slow travel suppresses any transmission noises which may occur. The spring stage 15 of the damper 11 for travel at extremely slow speeds has a plurality of springs 21, in this case four, which are offset with respect to one another in the peripheral direction, which springs 21 are located at a smaller distance from the axis of rotation 5 than the springs 19 and are somewhat harder than the springs 19, i.e. they have a somewhat steeper torque/relative-angle-of-rotation characteristic.

The third spring stage 17 is effective in load operation, and has a plurality of springs 23, in this case four, which are offset from one another in the peripheral direction and which springs 23 are relatively harder, i.e. they result in a correspondingly relatively steep torque/relative-angle-of-rotation characteristic of the torsional vibration damper.

The spring stages 13, 15 and 17 can be connected in series, and as explained in greater detail below, can have graduated ranges of relative angles of rotation or operating ranges in which they are active, which angles and ranges are defined and limited by stops. At least the springs 21 and 23 of the spring stages 15 and 17 are biased, so that the spring stages 15, 17 become active only when the torque drops below the initial torques of the spring stages 15, 17 defined by the biases. The initial torque of the spring stage 15 is thereby lower than the maximum final torque of the spring stage 13 which can be reached in the operating range of the spring stage 13. The same is true for the initial torque of the spring stage 17, which is lower than the final torque which can be reached by the spring stage 15 alone. As a result of this sizing, sudden changes in torque during the transition of the damping operation between spring stages 13 and 15 on the one hand and spring stages 15 and 17 on the other hand can be prevented, as explained in DE-A-34 07 524.

To bridge or bypass the spring stages 13 and 15 and to introduce the torque into the hub 1, the hub can be provided on its outside periphery 25 with outside toothing 27, in which outside toothing 27 a ring-shaped disc part 29 which has inside toothing 31 is engaged so that it can move axially but without rotational play. Axially on both sides of the disc part 29 there are also ring-shaped lateral discs 33, which lateral discs 33 are also axially movable with inside toothing 35, but which lateral discs 33 are engaged in the toothing 27 of the hub 1 with a rotational play which defines the working range of the relative angle of rotation of the spring stage 13.

The lateral discs 33 are non-detachably connected to one another by a plurality of axially running webs 37 which are offset from one another in the peripheral direction and which are formed in one piece with one of the lateral discs 33, and to which the other lateral disc 33 is fastened by hammer-tightening. The webs 37, in the vicinity of the points where they have been hammer-tightened, have shoulders, so that the two lateral discs 33 can absorb axial forces which push them toward one another.

Figure 1:
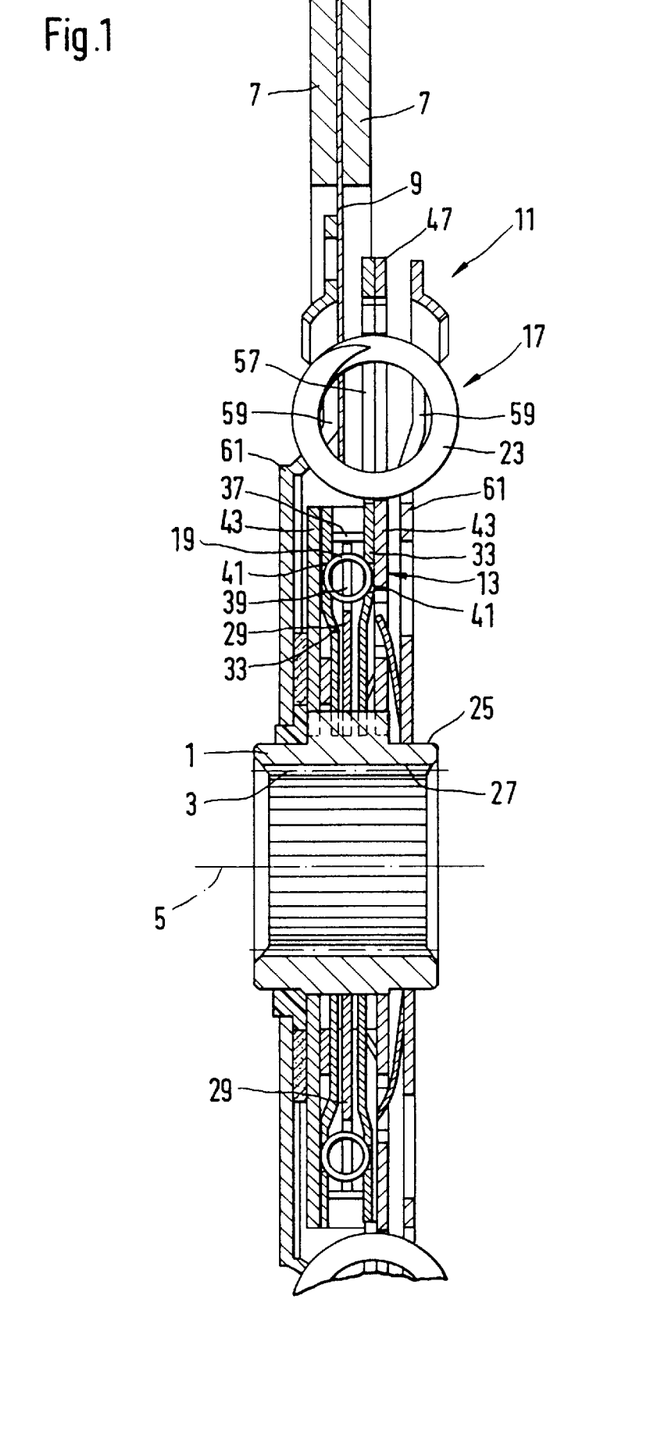
FIG. 1 is an axial longitudinal section through a clutch disc with a torsional vibration damper in accordance with the invention, viewed along Line I—I in FIGS. 3 and 4.
Figure 2:
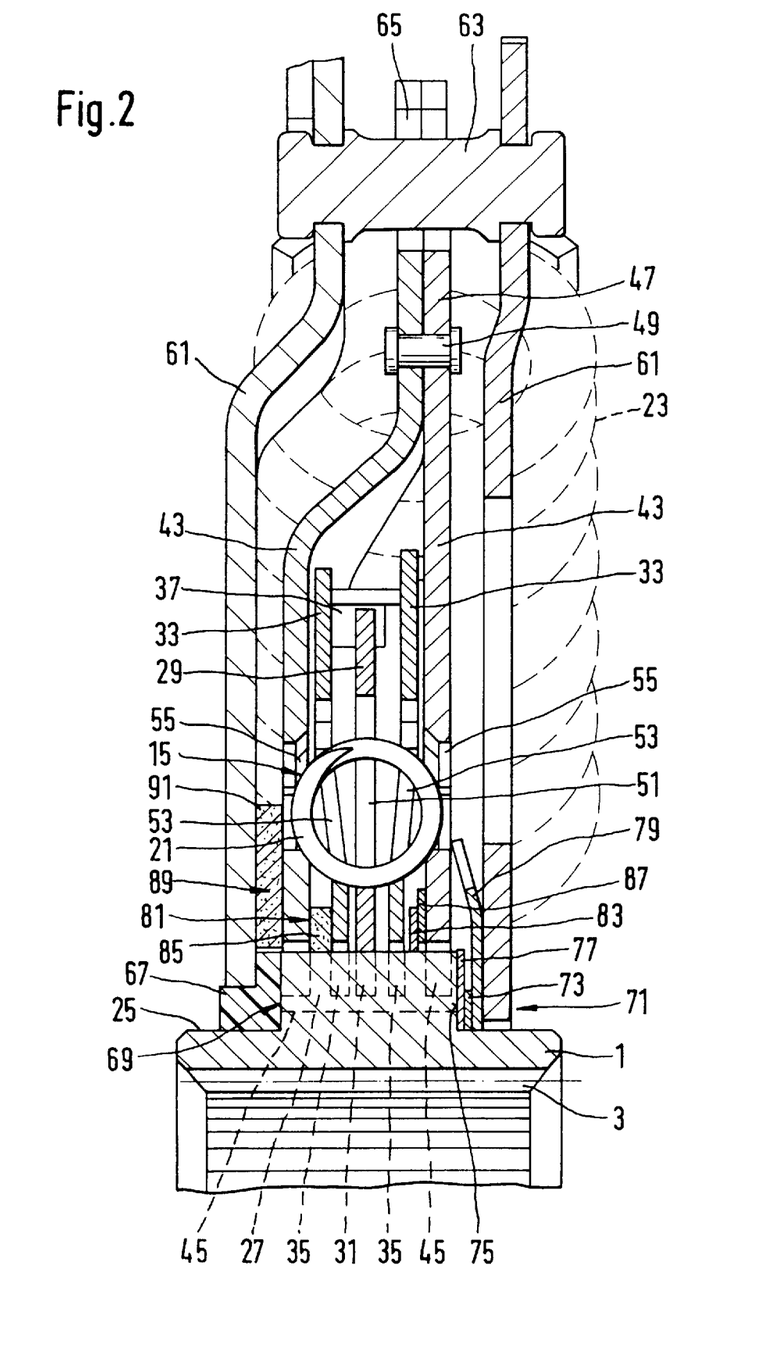
FIG. 2 is a detail of the torsional vibration damper shown in perspective, viewed along a Line II—II in FIGS. 3 and 4.

The springs 19 can sit in apertures 39 and 41 of the central disc 29, which apertures 39, 41 are axially oriented toward one another on one hand, and of the lateral discs 33 on the other hand (FIG. 1). While the apertures 41 of the lateral discs 33 have a continuous, closed peripheral contour, the apertures 39 of the central disc 29 are realized in the form of recesses which are open on their outside periphery.

On the sides of the lateral discs 33 facing axially away from one another, there are two additional ring-shaped lateral discs 43 which are engaged with their inside toothing 45 so that they are axially movable but also with rotational play in the outside toothing 27 of the hub 1. The rotational play of the lateral discs 43 is greater than the rotational play of the lateral discs 33 and defines the operating range of the relative angle of rotation of the spring stage 15 of the damper which is active at extremely slow speeds of travel. The lateral discs 43 extend radially beyond the disc part 29 and the two lateral discs 33, where they are connected to one another superficially to form a flange 47, and are non-detachably connected to one another by means of rivets 49.

The springs 21 of the spring stage 15 are located in apertures 51 and 53 which are oriented axially toward one another in the disc part 29 and in the lateral discs 33 respectively on one hand, and in apertures 55 in the lateral discs 43 on the other hand. While the apertures 51, 55 are large enough that the springs 21 can be introduced in the direction of the axis of rotation 5, the apertures 55 are designed so that they become narrower radially toward the axis of rotation so that the apertures 55 fix the springs 21 in position axially. While the springs 21 are held with their end surfaces between radially running terminal edges of the apertures 55 and/or of the apertures 53, the apertures 51 of the central disc part 29 are realized so that they are larger in the peripheral direction at least by the difference in rotational play between the toothings 35 and 45, so that the lateral discs 33 can move in the operating range of the spring stage 13 relative to the disc part 29 without exerting a load on the springs 21.

The springs 23 of the spring stage 17 of the load damper are guided axially and radially in apertures 57 which are oriented axially with respect to one another of the flange 47 on one hand, and apertures 59 of two lateral discs 61 on the other hand. The lateral discs 61 extend on the sides of the lateral discs 43 which face axially away from one another, and are non-detachably connected to one another by a plurality of spacer rivets 63 which spacer rivets 63 are distributed in the peripheral direction. The spacer rivets 63 run through peripheral recesses 65 of the flange 47 and also define the relative angle of rotation of the lateral discs 61 relative to the lateral discs 43 and thus relative to the hub 1. The friction linings 7 are fastened to one of the lateral discs 61, whereby this lateral disc 61 is guided by means of a plastic bearing ring 67 so that it can rotate on the peripheral surface 25 of the hub 1 and is axially fixed and held in position relative to an axial end surface 69 of the outside toothing 27 of the hub 1. The springs 23 also sit with bias in the apertures 57 and/or the apertures 59 to define the initial torque of the spring stage 17 at a value which is lower than the final torque of the spring stage 15.

The torsional vibration damper 11 described above functions as follows:

At small relative angles of rotation, the spring stages 15, 17 are assumed to be rigid, and only the springs 19 of the spring stage 13 of the pre-damper are active. If the torque to be transmitted within the rotational play of the pre-damper defined by the toothing 35 exceeds the initial torque of the spring stage 15 defined by the bias of the springs 21, then both spring stages 13, 15 are active with springs 19, 21 connected in series. After the rotational play of the toothing 35 has been used up, the spring stage 13 is bridged or bypassed, and the damper for operation at extremely slow speed is the only one active within the remaining available rotational play of the toothing 45. Before the rotational play of the toothing 45 is used up, the torque to be transmitted reaches the initial torque of spring stage 17 of the load damper as defined by the bias of the springs 23. In this range, the springs 21 and 23 of the spring stages 15, 17 are connected in series until the rotational play of the toothing 45 is used up. If there is a continued increase in the relative angle of rotation between the friction linings 7 and the hub 1, only the springs 23 of the load damper are active, until ultimately the spacer rivets 63 come into contact with the terminal edges of the recesses 65 and cause a total locking of the torsional vibration damper 11.

Figure 3:
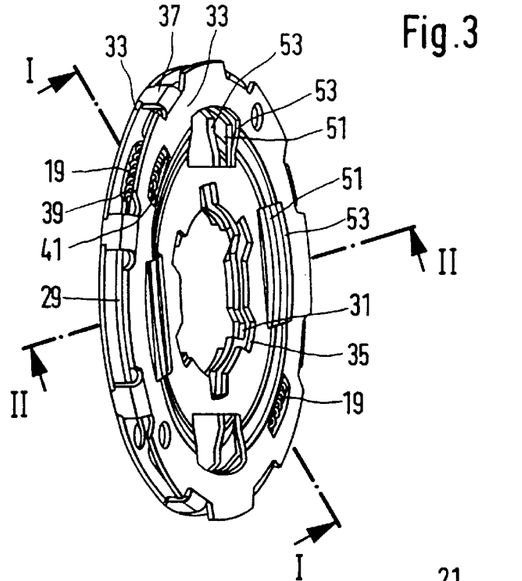
FIG. 3 is a perspective view of a first module of the torsional vibration damper illustrated in FIG. 1.
Figure 4:
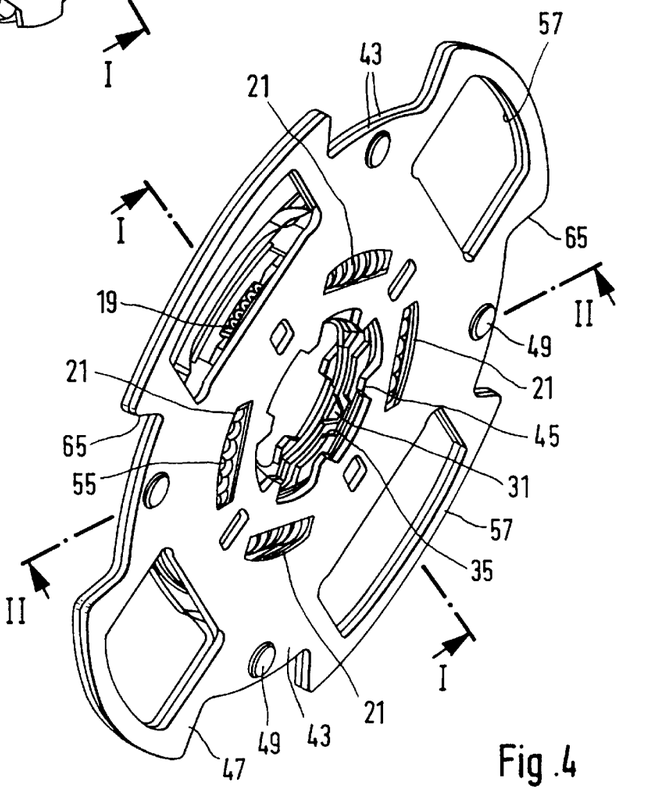
FIG. 4 illustrates a second module of the torsional vibration damper illustrated in FIG. 1.

As shown in FIG. 3, the disc part 29, the lateral discs 33 and the springs 19 of the spring stage 13 form a module which can be handled independently, and which already comprises all the components required for the functional testing of spring stage 13 of the pre-damper. FIG. 4 shows the module illustrated in FIG. 3 installed between the two lateral discs 43, after the springs 21 of the spring stage 15 have also been inserted into the apertures 51, 53 and the lateral discs 43 have been fastened to one another by means of the rivets 49. In this phase of the assembly, the spring stages 13 and 15 form a module which can be tested independently to guarantee its correct function. The configuration of the spring stages 13, 15 explained above makes it possible to distribute the overall assembly of the clutch disc over a plurality of assembly stations, which simplifies the overall assembly process.

Corresponding to the individual spring stages of the torsional vibration damper 11 explained with reference to FIGS. 1 to 4, there are friction devices which damp the torsional vibrations which occur in the working ranges of spring stages 13, 15 and 17. In the illustrated example, a basic friction device 71 (FIG. 2) which is active in all the spring stages 13, 15, 17 defines the friction damping of the spring stage 13 of the pre-damper all by itself. The basic friction device 71 comprises an axially acting spring 73, for example a spring plate or an ondular or corrugated washer, axially between one end surface 75 on the side of the outer toothing 27 of the hub 1 facing axially away from the end surface 69 on one hand, and the neighboring lateral disc 61 on the other hand, which basic friction device 71 clamps the bearing ring 67 by means of the lateral discs 61 which are non-detachably connected to one another against the end surface 69 of the outside toothing 27. In this manner, the bearing ring 67 is also used to generate friction force, and the spring 73 ensures the axial positioning of the torsional vibration damper 11 relative to the hub 1. Although it is not absolutely essential, the spring 73 is axially enclosed between two starting discs 77, 79 or similar devices, of which the starting disc 79 which is in contact with the lateral disc 61 is formed, in the illustrated embodiment, by a plate spring or by an additional friction device not explained below in any greater detail. The starting disc 79 can also be realized in the form of a starting disc which is separate from the plate spring.

Corresponding to the spring stage 15 of the damper for operation at extremely slow speeds, there is a friction device 81 which, between a pair of neighboring lateral discs 33, 43, comprises an axially acting spring 83, for example a plate spring or an ondular washer, and between the other pair of lateral discs 33, 43 a friction ring 85. The spring 83, which like the friction ring 85, centrally or concentrically surrounds the outside toothing 27 of the hub 1, can in turn be in contact by means of at least one starting disc with the lateral discs 33 and/or 43, as shown at 87. The force transmission path of the spring 83 runs on one hand via the lateral discs 33 and their connecting webs 37 to the friction ring 85, and on the other hand by means of the lateral discs 43 which are non-detachably connected to one another by means of the rivets 49. The friction device 81 is active in a range of the relative angle of rotation in which the torque to be transmitted by the torsional vibration damper 11 exceeds the initial torque of the spring stage 15, until the rotational play between the toothings 35 and 27 has been used up.

Corresponding to the spring stage 17 of the load damper is a friction device 89 which is sized for load operation. This friction device 89 comprises the above-mentioned axially acting spring 79 which is supported between the lateral discs 43 and 61 and in this case is realized in the form of a plate spring, as well as a friction ring 91 which is located between the pair of the two other lateral discs 43 and 61. The force transmission path of the spring 79 runs on one hand via the two lateral discs 43 which are non-detachably connected to one another and on the other hand via the lateral discs 61 which are non-detachably connected to one another toward the friction ring 91. The friction device 89 is active in a range of relative angle of rotation, the lower limit of which is defined by the initial torque of the spring stage 17, i.e. the bias of the springs 23, and the upper limit of which is defined by the limitation of the rotational angle of the components 63 and 65.

The following explanation relates to variants of the friction devices which can be used in a torsional vibration damper of the type described above. Components which correspond to one another with regard to their construction and/or their function are identified using the same reference numbers as in FIGS. 1 to 4, and are distinguished from one another by a letter index. With regard to the explanation of the construction and operation, reference is made to the entire preceding description.

Figure 5:
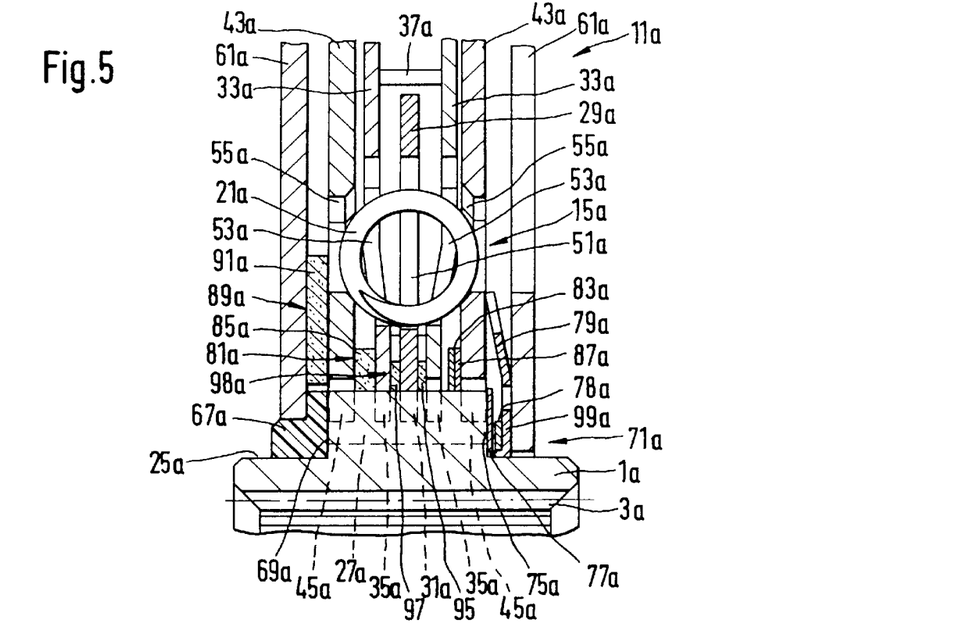
FIGS. 5 and 6 are details of a torsional vibration damper which is similar to the embodiment illustrated in FIG. 2, but which has variant friction devices.

The embodiment illustrated in FIG. 5 differs from the embodiment illustrated in FIGS. 1 to 4 essentially only in that, corresponding to the spring stage of the pre-damper, in addition to the basic friction device 71*a*, there is an additional friction device 93 which is active exclusively in the operating range of the pre-damper. The friction device 93 comprises an axially acting spring 95, for example a plate spring or an ondular washer, which is located axially between the central disc part 29*a* and the lateral disc 33*a*, as well as a friction ring 97 which is located on the side facing away from the spring 95 between the lateral disc part 29*a* and the other lateral disc 33*a*. The force transmission path of the spring 95 runs on one hand via the disc part 29*a* and on the other hand via the lateral disc 33*a*, which are non-detachably connected to one another, toward the friction ring 97. Because both the disc part 29*a* and also the lateral discs 33*a* are guided so that they can move axially on the toothing 27*a* of the hub 1*a*, the spring forces of the friction devices 81*a* and 89*a* of the damper for operation at extremely slow speeds and of the load damper run toward the corresponding friction rings on respectively separate paths. Because each spring stage has a separate friction device with its own spring, the friction moments of the individual spring stages can be defined at whatever level is desired in the respective operating ranges. As is also the case in the embodiment illustrated in FIGS. 1 to 4, the friction moments of the individual friction devices 81*a*, 89*a* and 93 are superimposed on the friction moment of the basic friction device 71*a*. In contrast to the embodiment illustrated in FIGS. 1 to 4, the spring 73*a* of the basic friction device 71 is not supported on the plate spring 79*a* which is part of the load friction device 89*a*, but on a starting disc 99 which is centrally or concentrically surrounded by the plate spring 79*a*.

Figure 5A:
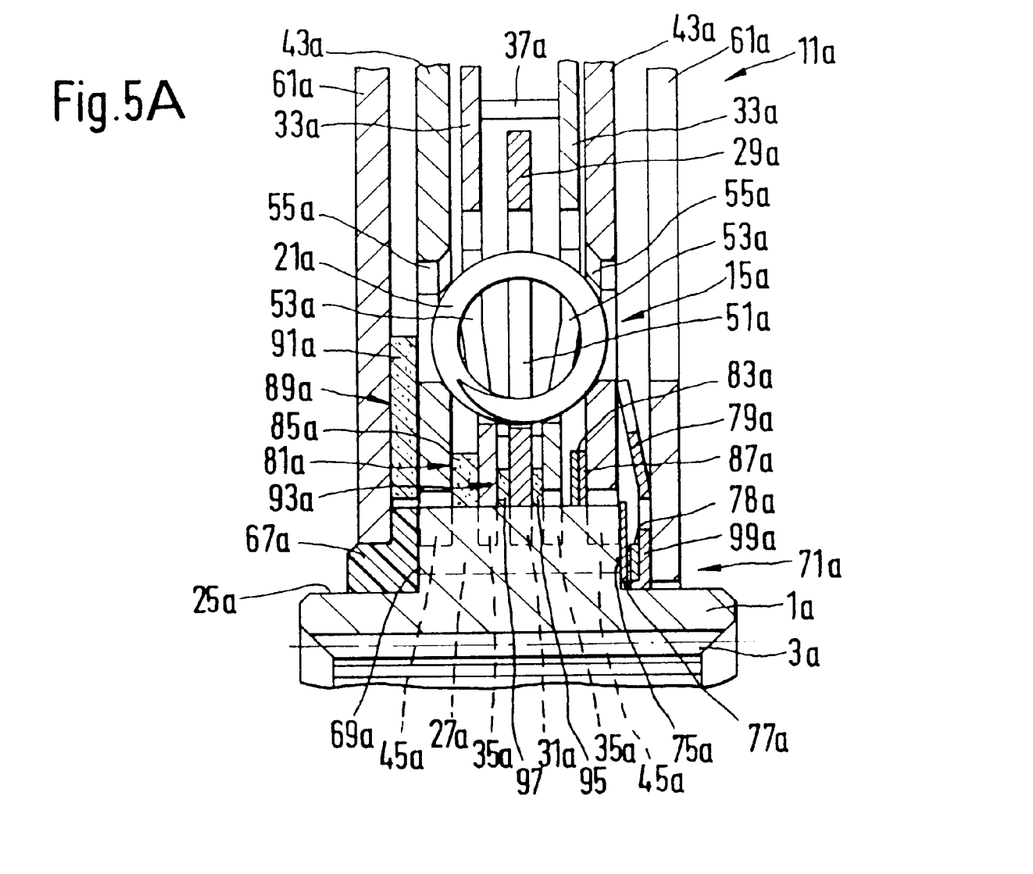
FIG. 5A shows additional detail of the embodiment in FIG. 5.

The embodiment illustrated in FIG. 5A differs from the embodiment illustrated in FIGS. 1 to 4 essentially only in that, corresponding to the spring stage of the pre-damper, in addition to the basic friction device 71*a*, there is an additional friction device 93*a* which is active exclusively in the operating range of the pre-damper. The friction device 93*a* comprises an axially acting spring 95, for example a plate spring or an ondular washer, which is located axially between the central disc part 29*a* and the lateral disc 33*a*, as well as a friction ring 97 which is located on the side facing away from the spring 95 between the lateral disc part 29*a* and the other lateral disc 33*a*. The force transmission path of the spring 95 runs on one hand via the disc part 29*a* and on the other hand via the lateral disc 33*a*, which are non-detachably connected to one another, toward the friction ring 97. Because both the disc part 29*a* and also the lateral discs 33*a* are guided so that they can move axially on the toothing 27*a* of the hub 1*a*, the spring forces of the friction devices 81*a* and 89*a* of the damper for operation at extremely slow speeds and of the load damper run toward the corresponding friction rings on respectively separate paths. Because each spring stage has a separate friction device with its own spring, the friction moments of the individual spring stages can be defined at whatever level is desired in the respective operating ranges. As is also the case in the embodiment illustrated in FIGS. 1 to 4, the friction moments of the individual friction devices 81*a*, 89*a* and 93 are superimposed on the friction moment of the basic friction device 71*a*. In contrast to the embodiment illustrated in FIGS. 1 to 4, the spring 73*a* of the basic friction device 71 is not supported on the plate spring 79*a* which is part of the load friction device 89*a*, but on a starting disc 99*a* which is centrally or concentrically surrounded by the plate spring 79*a*.

Figure 6:
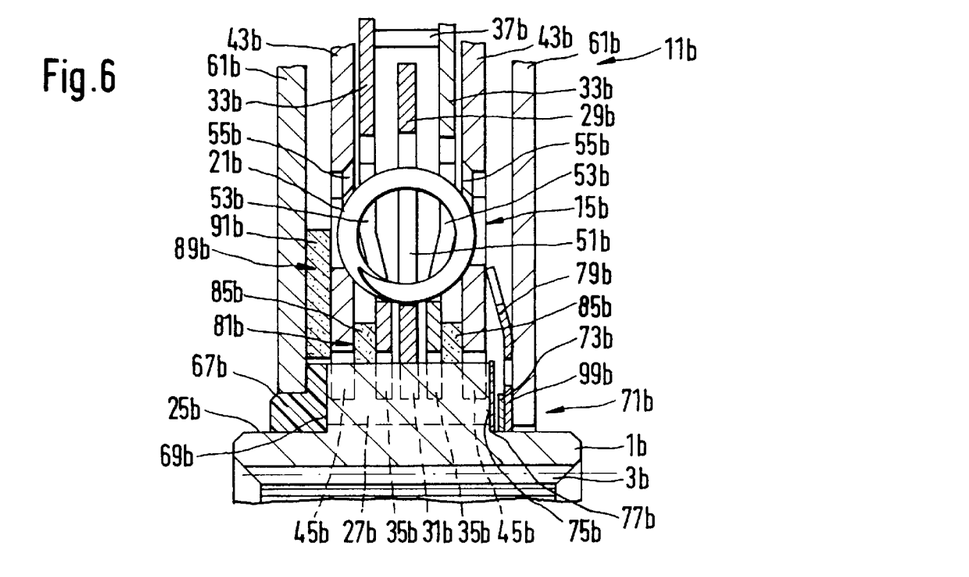

FIG. 6 illustrates an embodiment in which, in contrast to the embodiments of the friction device 81*b* of the damper for operation at extremely slow speeds and of the friction device 89*b*, the axially acting spring 79*b* can also be used for the generation of the friction force. In this embodiment, there are respective friction rings 85*b* between the two pairs of neighboring lateral discs 33*b* and 43*b*. The two lateral discs 43*b*, in contrast to the embodiment illustrated in FIGS. 1 to 4, however, are not supported axially on one another in a non-detachable manner, but are guided on one another so that they are non-rotational but can move axially. Similar to the embodiment illustrated in FIG. 7 and explained in greater detail below, one of the two lateral discs 43*b* has axially projecting webs (not shown), by means of which webs it is guided non-rotationally but so that it can move axially on the other lateral disc 43*b*. Because both lateral discs 43 in FIGS. 1 to 6 are actuated uniformly via the recesses 57 by the springs 23, a non-rotational connection by means of webs is not necessary. The force transmission path of the spring 79*b* runs on one hand via the lateral disc 43*b* shown on the right in FIG. 6, the friction ring 85*b*, the two lateral discs 33*b* which are connected non-detachably with one another and are supported axially on one another via the webs 37*b*, and the friction ring 85*b* shown on the left in FIG. 6 to the friction ring 91*b*. The return force transmission path runs from the friction ring 91*b* via the two lateral discs 61*b* which are non-detachably connected to one another back to the spring 79*b*. Because the lateral discs 43*b* and 33*b*, the friction rings 85*b* and the disc part 29*b* can move axially relative to the friction ring 91*b*, and moreover because the two lateral discs 43*b* can move axially relative to one another, the application force of the spring 79*b* is applied to all the friction rings 85*b* and 91*b* together. Sizing differences in the friction devices can be achieved by a variation of the average friction diameter of the friction rings and by an appropriate selection of the coefficients of friction on the materials which are used for the friction pairs.

Figure 7:
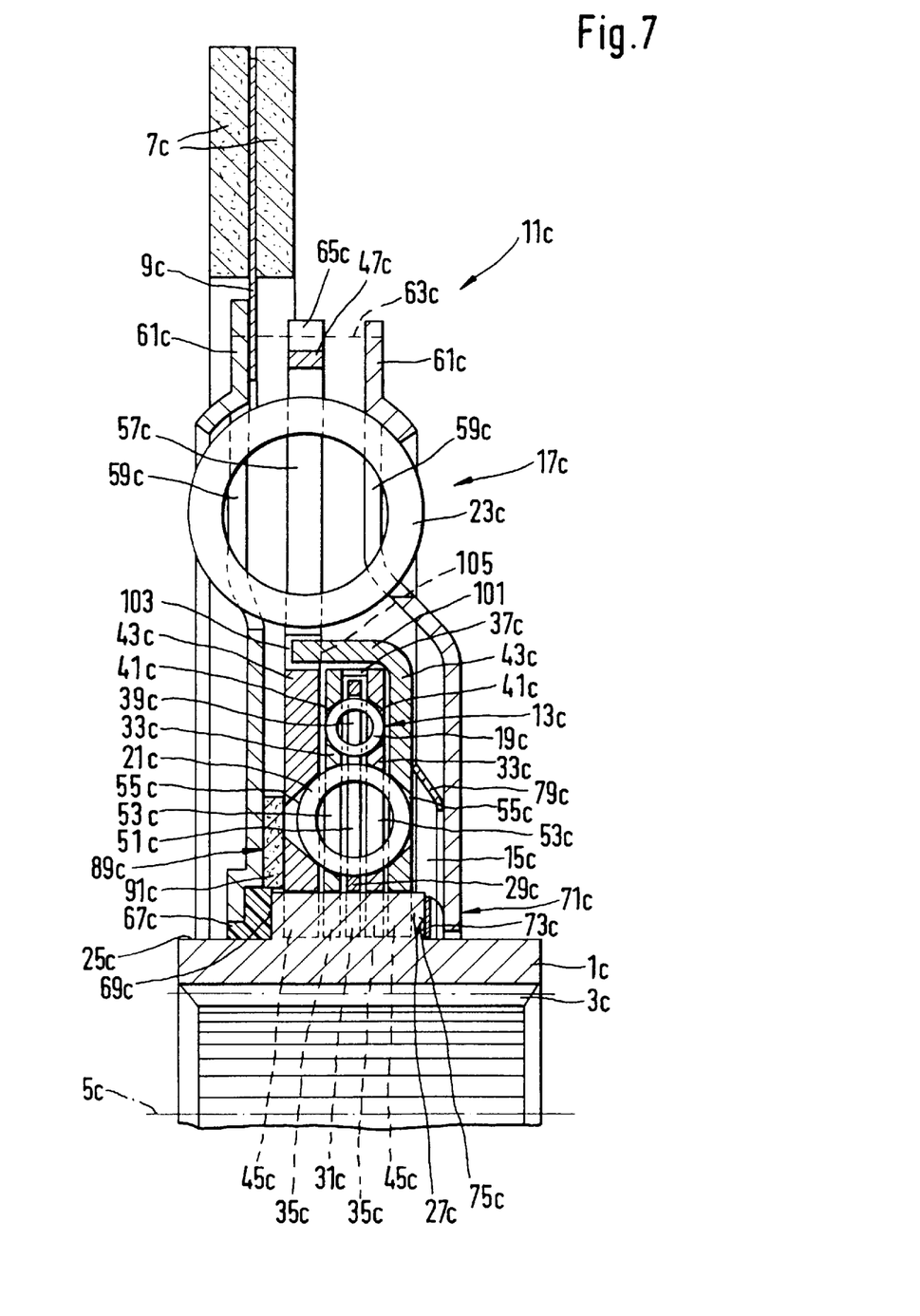
FIG. 7 is an axial longitudinal section through one half of a clutch disc with a variant of the torsional vibration damper which is illustrated in FIG. 1.

The embodiment illustrated in FIG. 7 differs primarily in terms of the construction of the lateral discs 43*c* which connect the spring stages 15*c* and 17*c* of the damper for operation at slow speeds and of the load damper. The flange 47*c* which contains the apertures 57*c* for the springs 23*c* of the load damper is formed by only one of the two lateral discs 43*c*. The other of the two lateral discs 43*c* carries, on its outside periphery and radially inside the area in which the springs 23*c* are located, a plurality of axially bent tabs 101 which are distributed around the periphery, which tabs 101 are engaged with their ends in recesses 103 of the lateral disc 43*c* which guides the springs 23*c*.

The tabs 101 ensure a non-rotational connection of the two lateral discs 43*c*. Depending on the type of the friction device provided between the lateral discs 43*c* and the lateral discs 33*c*, the invention teaches that the tabs 101 can be supported axially by means of axial shoulders 105 which are beside the recesses 103, as required, for example, by the friction device 81 illustrated in FIGS. 1 to 4, and/or the tabs 101 can be guided so that they can move freely axially in the recesses 103, as required by the friction device illustrated in FIG. 6. Such friction devices are not illustrated in detail in FIG. 7, but they can still be present. FIG. 7 shows a basic friction device 71*c* with an axially acting spring 73*c* and a bearing ring 67*c* used as a friction ring, as well as a load friction device 89*c* which has an axially acting spring 79*c* and a friction ring 91*c*, as explained above with reference to FIGS. 1 to 4. Otherwise, the construction of the again three-stage torsional vibration damper 11*c* corresponds to the torsional vibration damper illustrated in FIGS. 1 to 4. In particular, the two lateral discs 33*c*, the disc part 29*c* and the springs 19*c* can be pre-assembled to form a module as illustrated in FIG. 3, and when there is a non-detachable connection between the two lateral discs 43*c*, a pre-assembled component like the one illustrated in FIG. 4 can be created. It goes without saying that instead of the tabs 101, any other type of spacing means, such as spacer rivets or similar devices, can also be used.

Naturally, it is also possible to make the internal parts out of plastic, depending on the load. In that case, and depending on the configuration, friction rings can be replaced or may no longer be necessary, because the side parts can be used as friction surfaces.

One feature of the invention resides broadly in the torsional vibration damper to be installed in the drive train of a motor vehicle, in particular to be installed in a clutch disc of a motor vehicle friction clutch, comprising - an input component 7 which can rotate around an axis of rotation 5, - an output component 1 which can rotate both together with and relative to the input component 7 around the axis of rotation 5, - a damper spring system which couples the input component 7 and the output component 1 to one another with rotational elasticity, and has a plurality of spring stages 13, 15, 17 which are sized for different torque ranges of the torque to be transmitted between the input component 7 and the output component 1, which spring stages are graduated so that they are active in corresponding ranges of the relative angle of rotation between the input component 7 and the output component 1, characterized by the fact that the damper spring system comprises at least three spring stages 13, 15, 17, of which at least the first spring stage 13, which is sized for the range of the lowest torque, and the second spring stage 15, which is sized for the next-higher torque range, are connected in series, and the second spring stage 15 has an initial torque which is lower than the final torque of the first spring stage 13, and that the third spring stage 17 is sized for torques which are greater than the torques of the first 13 and the second 15 spring stage, and is located on the side of the first and the second spring stage facing radially away from the axis of rotation 5.

Another feature of the invention resides broadly in the torsional vibration damper characterized by the fact that the third spring stage 17 is connected in series with the first 13 and the second 15 spring stages.

Yet another feature of the invention resides broadly in the torsional vibration damper characterized by the fact that the third spring stage 17 has an initial torque which is lower than the final torque of the second spring stage 15.

Still another feature of the invention resides broadly in the torsional vibration damper characterized by the fact that the second 15 and/or the third 17 spring stage has at least one biased spring 21, 23 to generate an initial torque which is greater than zero.

A further feature of the invention resides broadly in the torsional vibration damper characterized by the fact that the damper spring system has at least three spring stages 13, 15, 17, of which a first spring stage 13 comprises at least one first spring 19 which couples a central disc part 29 which is non-rotationally connected to one of the modules—the input component 7 and output component 1—rotationally elastically with at least one first lateral disc 33 which is located axially to the side of the central disc part 29, and can rotate to a limited extent within a first relative angle of rotation relative to the central disc part 29, that a second spring stage 15 comprises at least one second spring 21 which couples each first lateral disc 33 rotationally elastically with at least one second lateral disc 43 which is located axially to the side of the first lateral disc 33 and can rotate to a limited extent within a second relative angle of rotation which is larger than the first relative angle of rotation relative to the central disc part 20, that each second lateral disc 43 is connected to the other of the modules—input component 7 and output component 1—in a torque-transmitting connection, and that the first spring stage 13 is sized for the range of the lowest torque to be transmitted between the input component 7 and the output component 1, and the second spring stage 15 is sized for the next-higher torque range.

Another feature of the invention resides broadly in the torsional vibration damper characterized by the fact that a third spring stage 17 of the damper spring system comprises at least one third spring 23 which couples each second lateral disc 43 rotationally elastically with two third lateral discs 61 which are located axially one on either side of the first 33 and second 43 lateral discs, and are non-rotationally connected to one another and to the other of the modules - input component 7 and output component 1.

Yet another feature of the invention resides broadly in the torsional vibration damper characterized by the fact that the central disc part 29, each first lateral disc 33 and each first spring 19 of the first spring stage 13 together form a module which can be handled separately from the other spring stages 15, 17.

Still another feature of the invention resides broadly in the torsional vibration damper characterized by the fact that the central disc part 29 is located axially between two lateral discs 33 which are non-detachably connected to one another and that the central disc part 29 and two first lateral discs 33 have apertures 39, 41, 51, 53 or recesses for the location of both each first 19 and also each second 21 spring, whereby each first spring 19 is fixed in position axially between the two first lateral discs 33, and each second spring 21 can be inserted into the module when the first lateral discs 33 are connected to form a module.

A further feature of the invention resides broadly in the torsional vibration damper characterized by the fact that the central disc part 29, together with each first lateral disc 33, is located axially between two lateral discs 43 which are non-rotationally connected to one another, and that the central disc part 29, each first lateral disc 33 and both second lateral discs 43 have apertures 51, 53, 55 or recesses for each second spring 21, whereby each second spring 21 is fixed in position axially between the second lateral discs 43.

Another feature of the invention resides broadly in the torsional vibration damper characterized by the fact that the central disc part 29, each first 33 and each second 43 lateral disc, including each first 19 and each second 21 spring, together form a module which can be handled separately from the third spring stage 17.

Yet another feature of the invention resides broadly in the torsional vibration damper characterized by the fact that the two second lateral discs 43 are non-detachably connected to one another, in particular by means of riveting, in an area which lies radially outside the central disc part 29 and each first lateral disc 33.

Still another feature of the invention resides broadly in the torsional vibration damper characterized by the fact that the one of the modules—input component 7 and output component 1—which is non-rotationally connected to the central disc part 29 has toothing 27, in which is engaged at least the one first lateral disc 33 with a rotational play which determines the first relative angle of rotation, and at least the one second lateral disc 43 is engaged with a rotational play which determines the second relative angle of rotation, but otherwise non-rotationally by means of matching toothing 35, 45.

A further feature of the invention resides broadly in the torsional vibration damper characterized by the fact that the central disc part 29 is also engaged non-rotationally in the toothing 27 by means of matching toothing 31.

Another feature of the invention resides broadly in the torsional vibration damper characterized by the fact that the other 7 of the two modules—input component 7 and output component 1—comprises two third lateral discs 61, axially between which each second lateral disc 43 is located, and that at least one second lateral disc 43 and both third lateral discs 61 have apertures 57, 59 or recesses for each third spring 23.

Yet another feature of the invention resides broadly in the torsional vibration damper characterized by the fact that there are two second lateral discs 43, which are in flat or surface contact with the side of each first lateral disc 33 radially farther from the axis of rotation, and in this area together form the aperture 57 or recess corresponding to each third spring 23.

Still another feature of the invention resides broadly in the torsional vibration damper characterized by the fact that the average distance of each first spring 19 from the axis of rotation 5 is greater than the average distance of each second spring 21 from the axis of rotation 5.

A further feature of the invention resides broadly in the torsional vibration damper characterized by the fact that each first 33 and or each second 43 lateral disc is essentially flat in the vicinity of each first spring 19.

Another feature of the invention resides broadly in the torsional vibration damper characterized by the fact that there are two ring-shaped first lateral discs 33 which are non-rotationally connected to one another, and which are at a smaller axial distance from one another in the vicinity of their inside periphery than in the vicinity of their outside periphery.

Yet another feature of the invention resides broadly in the torsional vibration damper characterized by the fact that the two first lateral discs 33 run conically or are conical discs in the vicinity of the apertures 51 or recesses which are used to locate the second springs 21.

Still another feature of the invention resides broadly in the torsional vibration damper characterized by the fact that one of the modules—input component 7 and output component 7—comprises a hub 1 which has toothing on its outside periphery, that the central disc part 29 has two first lateral discs 33 which are non-rotationally connected to one another and are axially supported on one another, and two second lateral discs 43 which are non-rotationally connected to one another and are axially supported on one another are engaged so that they can move axially in the toothing 27 of the hub 1 by means of matching toothing 35, 45 on at least one each of the first 33 and the second 43 lateral discs, that the central lateral disc 29, the first 33 and the second 43 lateral discs are located axially between two third lateral discs 61 which are non-detachably connected to one another, at least one of which third lateral discs can rotate on the hub 1 but is axially fixed in its position, and that components of at least one friction device 81, 89 are located axially each between at least one of the second lateral discs 43 and a neighboring first lateral disc 33 and axially between at least one of the second lateral discs 43 and a neighboring third lateral disc 61.

A further feature of the invention resides broadly in the torsional vibration damper characterized by the fact that the second lateral discs 43 are non-detachably connected to one another and the friction device 81 located between the first 33 and second 43 lateral discs as well as the friction device 89 located between the second 43 and third 61 lateral discs each comprise a separate, axially acting spring 83, 89.

Another feature of the invention resides broadly in the torsional vibration damper characterized by the fact that between one of the two second lateral discs 43*b* on the one hand and both the neighboring first lateral disc 33*b* and also the neighboring third lateral disc 61*b* on the other hand, there are respective friction rings 85*b*, 91*b,* and between the other of the two lateral discs 43*b* on the one hand and the neighboring first lateral disc 33*b* and the neighboring third lateral disc 61*b* on the other hand, there is an additional friction ring 85*b* or an axially acting spring 79*b* which is common to the friction devices 81*b*, 89*b*, whereby the additional friction ring 85*b* and the axially acting spring 79*b* are located on sides of the other second lateral disc 43*b* facing axially away from one another.

Yet another feature of the invention resides broadly in the torsional vibration damper characterized by the fact that the common axially acting spring 79*b* is located axially between the second lateral disc 43*b* and the neighboring third lateral disc 61*b*.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, are hereby incorporated by reference as if set forth in their entirety herein.

Examples of Torsional Vibration Dampers and components associated therewith which may be incorporated in embodiments of the present invention may be found in the following U.S. Pat. Nos. 5,575,363; 5,553,693; 5,515,956; 5,462,145; and 5,431,269.

The corresponding foreign patent publication applications, namely, Federal Republic of Germany Patent Application No. 196 13 574.5, filed on Apr. 4, 1996, having inventors Jürgen Kleifges and Erwin Wack, and DE-OS 196 13 574.5 and DE-PS 196 13 574.5, incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

The invention as described hereinabove in the context of the preferred embodiments is not to be taken as limited to all of the provided details thereof, since modifications and variations thereof may be made without departing from the spirit and scope of the invention.

What is claimed is:

1. A torsional vibration damper for a clutch disc of a motor vehicle friction clutch, said torsional vibration damper comprising:

an input element;
said input element having an axis of rotation;
said input element being rotatable about said axis of rotation;
an output element;
said output element being rotatable with respect to said axis of rotation;
a spring system to elastically couple said input element to said output element;
said spring system comprising:
  at least three spring sets;
  said at least three spring sets comprising a first spring set, a second spring set and a third spring set;
  said first spring set comprising at least one first spring to transmit a first range of torque between said input element and said output element;
  said second spring set comprising at least one second spring to transmit a second range of torque between said input element and said output element, said second range of torque being greater than said first range of torque;
  said third spring set comprising at least one third spring to transmit a third range of torque between said input element and said output element, said third range of torque being greater than said first and second ranges of torque; and
  said spring system being configured to compress at least a substantial portion of the total travel of said at least one first spring upon compression of said at least one first spring before said at least one second spring begins to compress;
said first spring set being disposed a first distance from said axis of rotation;
said second spring set being disposed a second distance from said axis of rotation;
said third spring set being disposed a third distance from said axis of rotation;
said third distance being greater than said both first distance and said second distance;
said spring system being configured to compress at least a substantial portion of the total travel of said at least one first spring upon compression of said at least one first spring and at least a substantial portion of the total travel of said at least one second spring upon compression of said at least one second spring, before said at least one third spring substantially begins to compress;
a central disc portion;
at least one first lateral disc having a first side and a second side;
said first side of said at least one first lateral disc being disposed axially adjacent said central disc portion;
said at least one first spring being disposed to connect said at least one first lateral disc to said central disc portion to permit limited rotation of said at least one first lateral disc with respect to said central disc portion;
at least one second lateral disc;
said at least one second lateral disc being disposed adjacent said second side of said at least one first lateral disc;
said at least one second spring being disposed to connect said at least one second lateral disc to said at least one first lateral disc to permit limited rotation of said at least one second lateral disc with respect to said at least one first lateral disc;
said central disc portion being non-rotationally connected to one of said input element and said output element;
said at least one second lateral disc being rotationally connected to the other one of said input element and said output element;
said central disc portion, said first spring set and said at least one first lateral disc being configured to form a modular component;
said at least one first lateral disc comprising two first lateral discs;
said central disc portion having first and second sides, said first and second sides being opposite one another;
one of said two first lateral discs being disposed adjacent said first side of said central disc portion;
the other one of said two first lateral discs being disposed adjacent said second side of said central disc portion;
said two first lateral discs being non-detachably and non-rotationally connected to each other;
each of said two first lateral discs comprising at least one aperture for said at least one first spring to axially fix each said at least one first spring between said two first lateral discs;
each of said two first lateral discs comprising at least one aperture for said at least one second spring;

said at least one second lateral disc comprising two second lateral discs;

each of said second lateral discs having a first side and a second side;

said two second lateral discs being non-rotationally connected to each other;

said first side of each said second lateral disc being disposed adjacent the second side of a corresponding one of said two first lateral discs;

each said second lateral disc comprising at least one aperture for said at least one second spring;

each said at least one second spring being axially fixed between said two second lateral discs;

said modular component being a first modular component;

said first modular component and said two second lateral discs and said at least one second spring being configured to form a second modular component;

a plurality of rivets;

said plurality of rivets being disposed to connect said two second lateral discs to one another in an area radially outside said central disc portion and said first lateral discs;

two third lateral discs;

said two third lateral discs being non-rotationally connected to each other;

each of said two third lateral discs having a first side and a second side;

said first side of each said third lateral disc being disposed adjacent said second side of a corresponding one of each said second lateral disc;

said two third lateral discs being connected to said other one of said input element and said output element than the one of said input element and said output element that said central disc element is connected to; and said at least one third spring being disposed to rotationally elastically connect said two second lateral discs to said two third lateral discs.

2. The torsional vibration damper according to claim 1 wherein at least one of said at least one second spring and said at least one third spring comprises at least one biased spring to generate an initial torque upon engagement of said at least one of said at least one second spring and said at least one third spring.

3. The torsional vibration damper according to claim 2 wherein:

said one of said input element and said output element non-rotationally connected to said central disc portion comprises toothing;

said toothing of said one of said input element and said output element is disposed to operatively engage said two first lateral discs to allow a first relative angle of rotation between said two first lateral discs and said central disc portion;

said toothing of said one of said input element and said output element is disposed to operatively engage said two second lateral discs to allow a second relative angle of rotation between said two second lateral discs and said central disc portion;

said central disc portion comprises toothing; and said toothing of said one of said input element and said output element is disposed to non-rotationally engage said toothing of said central disc portion.

4. The torsional vibration damper according to claim 3 wherein:

each said third lateral disc comprises at least one aperture for said at least one third spring; and at least one of said two second lateral discs comprises at least one aperture for said at least one third spring.

5. The torsional vibration damper according to claim 4 wherein said first distance is greater than said second distance.

6. The torsional vibration damper according to claim 5 wherein:

each of said two first lateral discs comprises a first portion and a second portion;

said first portion of each of said two first lateral discs is disposed adjacent the axis of rotation;

said two first lateral discs defining a first axial distance between said first portions of said two first lateral discs;

said two first lateral discs defining a second axial distance between said second portions of said two first lateral discs;

said first axial distance being less than said second lateral distance;

said two first lateral discs each comprise a conical portion; and said conical portion of each of said two first lateral discs is disposed adjacent said at least one second spring.

7. The torsional vibration damper according to claim 6 wherein:

at least one of said two first lateral discs and said two second lateral discs each comprise a flat portion; and said flat portion is disposed substantially adjacent said at least one first spring.

8. The torsional vibration damper according to claim 7 comprising:

a plurality of friction devices;

at least one of said plurality of friction devices being disposed between adjacent ones of said two third lateral discs and said two second lateral discs; and at least one of said plurality of friction devices being disposed between adjacent ones of said two second lateral discs and said two first lateral discs.

9. The torsional vibration damper according to claim 8 wherein:

each of said plurality of friction devices comprises a spring; and each said spring is configured to act in the axial direction.

10. The torsional vibration damper according to claim 8 wherein:

said at least one of said plurality of friction devices disposed between an adjacent one of said two third lateral discs and said two second lateral discs comprises an axially acting spring;

said at least one of said plurality of friction devices disposed between the other adjacent one of said two third lateral discs and said two second lateral discs comprises a friction ring; and said at least one of said plurality of friction devices disposed between adjacent ones of said two second lateral discs and said two first lateral discs comprises a friction ring.

* * * * *

UNITED STATES PATENT AND TRADEMARK OFFICE
CERTIFICATE OF CORRECTION

PATENT NO. : 5,988,343
DATED : November 23, 1999
INVENTOR(S) : Jürgen KLEIFGES and Erwin WACK It is certified that error appears in the above-identified patent and that said Letters Patent is hereby corrected as shown below:

On the title page, item [56], under the FOREIGN PATENT DOCUMENTS section, add the following reference:
--242213      2/1990      Japan--.

In column 17, line 24, after '196 13 574.5,' insert --are hereby--.

Signed and Sealed this

Twenty-first Day of November, 2000

Attest:

Q. TODD DICKINSON

Attesting Officer    Director of Patents and Trademarks